United States Patent [19]
Sakuragi et al.

[11] Patent Number: 5,671,778
[45] Date of Patent: Sep. 30, 1997

[54] REPAIRING TUBE, METHOD FOR REPAIRING PIPE LINES THEREWITH AND METHOD FOR REMOVING THE REPAIRING TUBE

[75] Inventors: Hiroyuki Sakuragi, Kobe; Masahiro Seshimo, Nishinomiya; Futoshi Makimoto, Otsu; Shinichi Takebe, Suita; Takuji Sokawa, Shiga-ken; Hitoshi Saito, Toyonaka, all of Japan

[73] Assignee: Ashimori Kogyo Kabushiki Kaisha, Osaku-ku, Japan

[21] Appl. No.: 367,359

[22] PCT Filed: Apr. 27, 1994

[86] PCT No.: PCT/JP94/00704

§ 371 Date: Jan. 20, 1995

§ 102(e) Date: Jan. 20, 1995

[87] PCT Pub. No.: WO94/27808

PCT Pub. Date: Dec. 8, 1994

[30] Foreign Application Priority Data

May 24, 1993 [JP] Japan .................. 5-145493
Mar. 14, 1994 [JP] Japan .................. 6-069955

[51] Int. Cl.⁶ ............................................. B29C 63/34
[52] U.S. Cl. .................. 138/97; 138/125; 138/137; 156/287; 264/36; 264/269; 264/516
[58] Field of Search ............................. 138/125, 126, 138/127, 137, 140, 141, 145, 153, 97, 98; 264/36, 269, 516; 156/287, 294

[56] References Cited

U.S. PATENT DOCUMENTS

| | | | |
|---|---|---|---|
| 3,560,295 | 2/1971 | Kimbrell et al. | 264/516 |
| 4,650,703 | 3/1987 | Kleinheins | 138/140 |
| 4,791,965 | 12/1988 | Wynn | 138/137 |
| 4,863,365 | 9/1989 | LeDoux et al. | |
| 4,867,921 | 9/1989 | Steketee, Jr. | |
| 4,950,446 | 8/1990 | Kinumoto et al. | 264/269 |
| 4,985,196 | 1/1991 | LeDoux et al. | |
| 4,986,951 | 1/1991 | Ledoux et al. | |
| 5,164,237 | 11/1992 | Kaneda et al. | 138/125 |
| 5,344,511 | 9/1994 | Graefe et al. | 138/125 |
| 5,395,472 | 3/1995 | Mandich | 264/516 |

FOREIGN PATENT DOCUMENTS

| | | |
|---|---|---|
| 1394807 | 3/1965 | France . |
| 58-88281 | 5/1983 | Japan . |
| 64-56531 | 3/1989 | Japan . |
| 64-64827 | 3/1989 | Japan . |
| 2-074321 | 6/1990 | Japan . |
| 2-202431 | 8/1990 | Japan . |
| 3-47733 | 2/1991 | Japan . |
| 3-151225 | 6/1991 | Japan . |
| 3-256727 | 11/1991 | Japan . |
| 2251472 | 7/1992 | United Kingdom . |

*Primary Examiner*—Mathieu D. Vargot
*Attorney, Agent, or Firm*—Birch, Stewart, Kolasch & Birch, LLP

[57] ABSTRACT

The present invention provides a repairing tube to be used in pipe lines such as gas conduits, water supply lines and sewer lines, chiefly those buried in the ground, for the purpose of repairing the pipe lines. More particularly, the present invention relates to a repairing tube including a rigid pipe formed of thermoplastic resin and a tubular woven fabric and a method for repairing or reinforcing a pipe line with the repairing tube. Furthermore, the present invention relates to a method for removing the repairing tube in its collapsed form out of the pipe line, for example when the repairing tube installed in the pipe line has become superannuated or it has been collapsed for some reason or other to impair the function of the pipe line and hence it is desired to reline the pipe line.

32 Claims, 16 Drawing Sheets

1

REPAIRING TUBE, METHOD FOR REPAIRING PIPE LINES THEREWITH AND METHOD FOR REMOVING THE REPAIRING TUBE

TECHNICAL FIELD

The present invention provides a tubular material for repairing pipe lines (hereinafter referred to as repairing tube) which is to be used in pipe lines such as gas conduits, water supply lines and sewer lines, chiefly those buried in the ground, for the purpose of repairing the pipe lines. More particularly, the present invention relates to a repairing tube comprising a rigid pipe formed of thermoplastic resin and a tubular woven fabric and a method for repairing or reinforcing a pipe line with the repairing tube. Furthermore, the present invention relates to a method for removing the repairing tube in its collapsed form out of the pipe line, for example when the repairing tube installed in the pipe line has become superannuated or it has been collapsed for some reason or other to impair the function of the pipe line and hence it is desired to reline the pipe line.

BACKGROUND ART

A lining-based method for repairing a pipe line has already been known, wherein a rigid thermoplastic resin pipe formed of rigid polyethylene, rigid polyvinyl chloride or the like is inserted into the pipe line, and the resin pipe is softened by heating and then inflated under pressure to form a rigid tube in the pipe line.

Insertion, however, of rigid resin pipes in their cylindrical shape into pipe lines is only possible with great difficulty, and handling of lengthy resin pipes in their cylindrical shape is also not easy because, for example, of taking up substantial space.

In this conventional method, a rigid resin pipe is brought, before being inserted into a pipe line, into a state which will not give rise to any significant resistance in the pipe line, for example, by using as the resin pipe a pipe with a smaller diameter than the inner diameter of the pipe line or by flattening and deforming into a U-shaped cross-section the resin pipe. After the resin pipe has been inserted into the pipe line, a heated and pressurized fluid is fed into the resin pipe thereby to soften and simultaneously expand the resin pipe so that it conforms to the interior surface of the pipe line (see, for example, U.S. Pat. Nos. 4,867,921 and 4,985,196; Japanese published unexamined patent application Nos. 58-88281 (JP, A, 58-88281), 64-64827 (JP, A, 64-64827) and 2-202431 (JP, A, 2-202431).

As a representative method for deforming such resin pipes for reduction in dimension there may be mentioned a method described in U.S. Pat. No. 4,867,921. This method involves producing a resin pipe 100 by extrusion molding, flattening the resin type immediately thereafter, folding double the resin pipe 100 kept in its flattened configuration as shown in FIG. 20, winding the so configured resin pipe 100 onto rolls for storage, pulling the resin pipe as such into a pipe line at the site of execution and then feeding steam into the resin pipe 100 to conform it against the interior wall surface contours of the pipe line.

Another method described in Japanese published unexamined patent application No. 58-88281 (JP, A, 58-88281) involves flattening a synthetic resin pipe, further folding double the synthetic resin pipe kept in its flattened configuration, inserting the resulting synthetic resin pipe into a pipe line and then feeding steam into the synthetic resin pipe to heat and pressurize the same so that the pipe conforms to the interior surface wall contours of the pipe line.

Japanese published unexamined patent application No. 64-64827 (JP, A, 64-64827) discloses another method wherein a synthetic resin pipe in a heated and thereby softened state is supported on a long supporting member and the supporting member is pulled into a pipe line thereby to concomitantly insert the synthetic resin pipe carried thereon into the pipe line. As the supporting member there is used a fiber-reinforced plastic sheet, both side edges of the sheet constituting a fastener which when closed brings the sheet into a tubular configuration. The synthetic resin pipe mentioned above is wrapped in this fiber-reinforced plastic sheet provided with the fastener and the plastic sheet having the synthetic resin pipe is pulled into a pipe line while simultaneously pulling thereinto the synthetic resin pipe supported by the plastic sheet. Thereafter, the fastener is opened to remove the plastic sheet out of the pipe line for recovery and the interior of the synthetic resin pipe is pressurized to conform it against the interior wall surface contours of the pipe line.

Still another such method for installing a lining pipe in a pipe line is described in Japanese published unexamined patent application No. 2-202431 (JP, A, 2-202431), wherein a synthetic resin pipe having reinforcing tensile strips embedded in its circumferential wall along the longitudinal axis. As the reinforcing strips there are used strip members of small widths and about 4–10 such strip members are arranged, with equal spacing between them, on the exterior wall surface of the synthetic resin pipe. In pulling the synthetic resin pipe with such strip members, the members serve to prevent the synthetic resin pipe now in a heated and thereby softened state from being excessively extended.

PROBLEMS TO BE SOLVED BY THE INVENTION

Any of the above-mentioned methods, however, involves the step of heating the synthetic resin pipe by feeding a heated fluid thereinto and it is difficult to insure even heating over the entire length and circumference of the synthetic resin pipe. Such problems hence arise as generation of unevenly heated or too much heated and excessively softened portions, or of insufficiently softened portions in the synthetic resin pipe. Application of internal pressure to a pipe under such problematic state will give rise to uneven expansion in dependence upon the degree of such partial softening, which leads to the problem, for example, of highly softened portions being locally expanded into too thin a wall thickness and/or cracked.

Especially in those methods for inserting a synthetic resin pipe into a pipe line where the synthetic resin pipe in its cylindrical shape is flattened and then folded into a U-shaped cross-section and hence expansion of the thus flattened and folded synthetic resin pipe into its original cylindrical configuration is needed, expansion of excessively heated portions alone may take place, while leaving the flattened and folded portions not expanded properly, when the synthetic resin pipe is unevenly heated.

Furthermore, in the method described in U.S. Pat. No. 4,867,921, the resin pipe 100 is flattened and folded double immediately after its molding and the resin pipe 100 is therefore fixed and retained in this configuration. As a consequence, when the so configurated resin pipe is inserted into a pipe line and then heated and pressurized, it expands temporarily into a cylindrical shape as depicted by the chain line in FIG. 21 but is still under existence of residual stress because the memory of the configuration fixed in the flattened and folded state is retained in the material constituting the resin pipe 100. The method therefore presents the following drawback. Thus, when external pressure is exerted on the resin pipe 100 due, for example, to underground water being infiltrated through damaged parts of the pipe line, the resin pipe 100 is easily deformed into an approximately U-shaped cross-section as depicted by the solid line in FIG. 21 without being able to withstand such external pressure while keeping its cylindrical shape intact, since the resin pipe 100 retains the memory of returning to its original flattened and double folded state. The long term use of pipe lines having synthetic resin pipes installed by the above-described method will thus deform the synthetic resin pipes into an approximately U-shaped cross-section thereby to narrow the interior channel.

In U.S. Pat. No. 4,985,196 as well as in Japanese published unexamined patent application No. 64-56531, there is described a method for deforming a cylindrical resin pipe into an approximately U-shaped cross-section by pushing a portion thereof inwardly. Also in this method the resin pipe retains the memory of returning to its original approximately U-shaped cross-section and therefore tries, when expanded, to return to its original configuration upon exertion of external pressure.

Furthermore, resin pipes per se used in these methods are rigid ones. It is therefore not easy to insert them into pipe lines even with reduced cross-sections. This is especially the case where bends are provided in the pipe line and the resin pipe needs to be inserted thereinto along the contours of the bends. Thus, these rigid resin pipes are difficult to bend at bends and if the difficult-to-bend resin pipes are then forced into pipe lines there is a danger of the resin pipes being damaged or cracked.

The leading end of a resin pipe to be inserted into a pipe line specially needs, at a bend portion or drop in joint of the pipe line, to follow the contours thereof and also to change its direction. When the leading end portion is rigid, however, its direction change becomes difficult and its insertion also becomes difficult since its advance is prone to be hindered by the bend portion or drop in joint.

To eliminate these difficulties, an attempt to heat, and thereby to soften, a resin pipe immediately prior to its insertion into a pipe line has been done. It, however, presents the problem that the pulling of the resin pipe into the pipe line is time-consuming and the resin pipe is cooled meanwhile and hence becomes rigid and hard to bend, so that its leading end portion may be directed only with difficulty and/or be prevented from advancing.

On the other hand, when it is desired, as a resin pipe installed in a pipe line becomes superannuated, to remove the resin pipe, the resin pipe is cut out in portions or heated to soften the same and then pulled out of the pipe line by force.

In one method where a resin pipe installed in a long pipe line is removed by cutting it out, it is not an easy task but rather a time-consuming operation. In addition, the pipe line per se is frequently damaged in the course of the cutting operation.

In the other method based on the pulling out of the resin pipe, it is not easy, and requires extremely great force, to pull out the pipe installed in intimate contact with the interior wall surface contours of the pipe line even if the resin is in a heated and thereby softened state. Furthermore, when the pulling force is excessive, the pipe line per se can be broken, in which case it becomes even more difficult to remove the residual resin pipe in the pipe line.

DISCLOSURE OF INVENTION

The present invention has been accomplished to overcome the drawbacks associated with prior art techniques as described above.

Thus, an object of the present invention is to provide a repairing tube which can be evenly expanded over the entire length and circumference without giving rise to any unevenness in the way in which it is expanded, even if uneven heating took place in parts when a heated and pressurized fluid is fed thereinto, and which therefore is able to properly conform to the interior wall surface contours of the pipe line.

Another object of the present invention is to provide a means by which a repairing tube can be easily deformed, upon heating, into an approximately V- or U-shaped cross-section without being expanded and can be easily inserted into pipe lines while maintaining that configuration.

A further object of the present invention is to provide a method whereby a repairing tube lining a pipe line can be easily pulled out of the pipe line by little force.

Thus, in accordance with the present invention, there is provided a repairing tube for insertion in pipe lines to repair them, which comprises a rigid pipe formed of thermoplastic resin and a tubular woven fabric, the tubular woven fabric being integrated with the pipe either by being placed on the interior or exterior wall surface of the pipe or by being embedded in the thermoplastic resin layer of the pipe.

As the tubular woven fabric mentioned, any woven fabric is suitable that is composed of the warps which shows great extension under light load and which once extended to a certain length is able to withstand heavy load without showing any further extension. As tubular woven fabrics equipped with these characteristics those are particularly suitable wherein crimped yarns of synthetic fibers, or covered yarns comprising elastic yarns having synthetic yarns turned spirally thereon are used as the warp.

Another preferred embodiment of the repairing tube comprises a rigid pipe composed of an inner resin layer formed of thermoplastic resin having a softening point higher than the temperature of a heated and pressurized fluid to be fed into the tube and an outer resin layer formed of synthetic resin having a softening point lower than that of the thermoplastic resin forming the inner resin layer and a tubular woven fabric integrated with the pipe by being overlaid onto the inner resin layer constituting the interior wall surface of the pipe. As for resin materials for the respective layers there are preferably used high density polyethylenes as the thermoplastic resin forming the inner resin layer and linear low density polyethylenes as the thermoplastic resin forming the outer resin layer.

Furthermore, in accordance with the present invention, there is provided a method for repairing a pipe line, which comprises the steps of: flattening a repairing tube comprising a rigid pipe formed by extrusion molding of thermoplastic resin into a cylindrical shape and a tubular woven fabric at a temperature in the vicinity of the Vicat softening point of the thermoplastic resin forming the tube; heating the repairing tube in its flattened state to a temperature which is well below the Vicat softening point of the thermoplastic resin and at which the tube is deformable; bending the heated tube, while keeping it in its flattened state, into an approximately V- or U-shaped cross-section; inserting the thus bent tube into the pipe line; and expanding the tube by applying internal pressure thereto while heating the tube to a temperature higher than the temperature for the bending.

In a more preferable embodiment of the pipe line-repairing method mentioned above, the cylindrical-shaped repairing tube is flattened while sealing air-tightly the ends of the tube; the tube in its flattened state is bent into a V- or U-shaped cross-section; the thus bent tube is inserted into a pipe line; and a heated and pressurized fluid is fed into the tube thereby to conform it to the interior wall surface contours of the pipe line.

In another embodiment of the method, the cylindrical-shaped repairing tube is flattened and evacuated through its ends; the tube is then bent, while kept in its flattened configuration, into an approximately V- or U-shaped cross-section; the thus bent tube is inserted into the pipe line; and a heated and pressurized fluid is then fed into the tube to expand it and to conform it to the interior wall surface contours thereof.

In a further embodiment of the method, the cylindrical-shaped repairing tube is flattened; the tube is bent, while kept in its flattened state, into an approximately V- or U-shaped cross-section; the tip portion of a hose is placed at the leading end portion of the thus bent tube; a heated fluid is fed from the hose into the repairing tube or into the interspace between the repairing tube and the pipe line while inserting the repairing tube into the pipe line; and a heated and pressurized fluid is fed into the tube to expand it and to conform it to the interior surface wall contours of the pipe line.

Furthermore, in accordance with the present invention, there is also provided a method for removing a repairing tube out of a pipe line lined therewith, which comprises the steps of sealing air-tightly both end portions of the repairing tube with which the pipe line is lined; the interior of the tube is evacuated to release the tube from the interior wall surface of the pipe line and also to deform the tube into a reduced cross-section; and the repairing tube is pulled out of the pipe line.

More preferable embodiments of the method for removing a repairing tube from a pipe line therewith are as follows:

Method (1), wherein the repairing tube lining the pipe line is heated over its entire length and the evacuation of the interior of the tube is performed while the repairing tube is in a softened state; and Method (2), wherein the repairing tube lining the pipe line is heated by filling the same with pressurized steam; the pressure in the tube interior is caused to be reduced through condensation of the pressurized steam to release the repairing tube from the interior wall surface and also to deform it into a reduced cross-section; and the repairing tube is then pulled out of the pipe line.

DESCRIPTION OF THE EMBODIMENTS OF THE INVENTION

Figure 1:
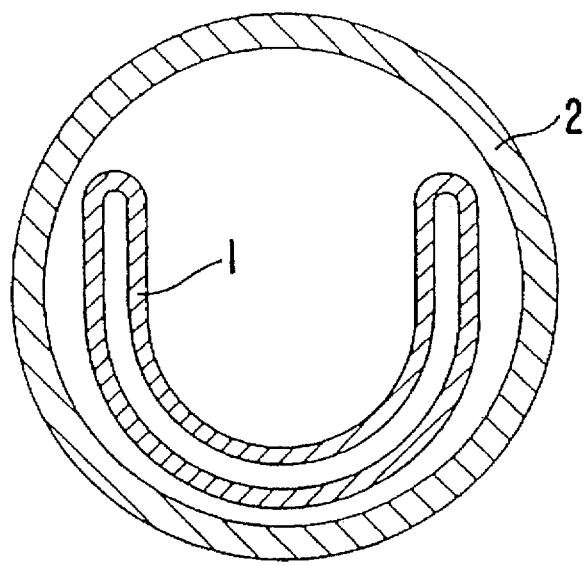
FIG. 1 is a transverse cross section of a pipe line 2 having inserted therein the repairing tube 1 of the present invention.

FIG. 1 shows the repairing tube 1 of the present invention after it has been inserted in a pipe line 2. The repairing tube 1 is in a flattened state and of approximately U-shaped cross-section. In repairing the internal wall surface of the pipe line 2, a heated and pressurized fluid is fed into the repairing tube 1 to heat and soften the rigid pipe formed of thermoplastic resin. The tube is thereby expanded and conformed to the interior wall surface contours of the pipe line 2.

Figure 2:
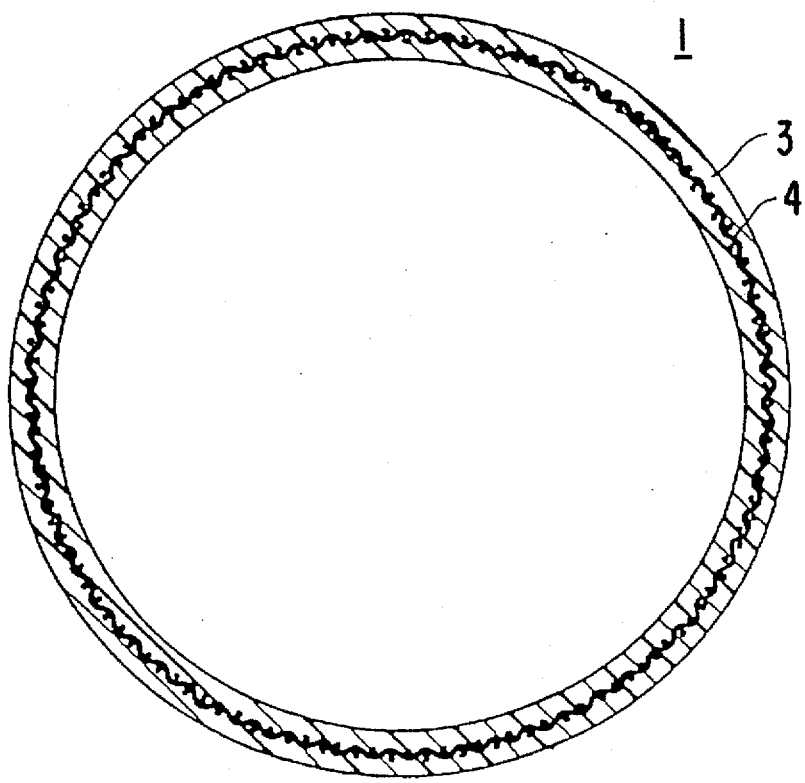
FIG. 2 is a transverse cross section of an embodiment of the repairing tube 1 of the present invention.

FIG. 2 illustrates an embodiment of the repairing tube 1 of the present invention. The repairing tube 1 is formed by integration of a rigid pipe 3 of thermoplastic resin with a tubular woven fabric 4 so that the tubular woven fabric is embedded in the wall of the rigid pipe 3.

As the rigid pipe 3 there may be used ones formed of rigid polyethylene or rigid polyvinyl chloride. As the tubular woven fabric 4 there may be used those woven fabrics of natural or synthetic fibers, preferably of texture with relatively coarse meshes.

Figure 3:
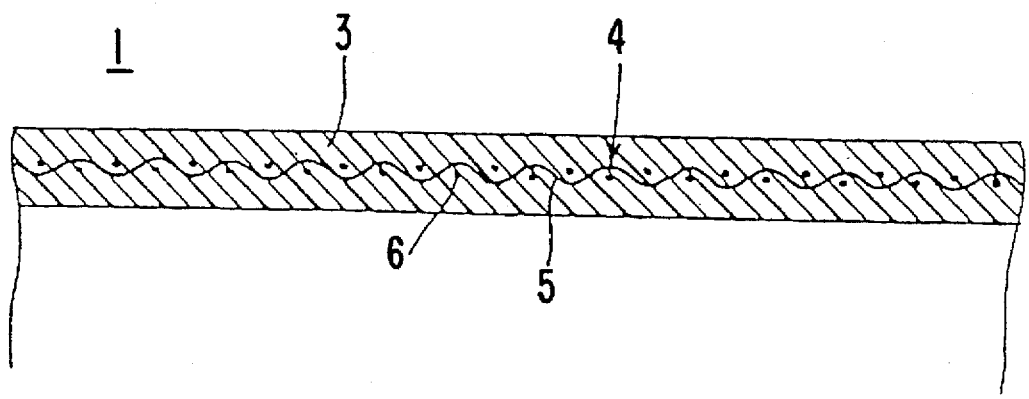
FIG. 3 is a schematic view in longitudinal section of a portion of the wall of the repairing tube 1 shown in FIG. 2.

FIG. 3 is a partial view in longitudinal section of the wall of the repairing tube 1 of FIG. 2, showing that the tubular woven fabric 4 is of cylindrical structure made by weaving the warp 5 and the weft 6.

As the warp 5 for the tubular woven fabric 4, there may be used those yarns equipped with the following characteristics: they show high extension under low load and once extended to a certain length show no more extension while supporting high load.

Figure 4:
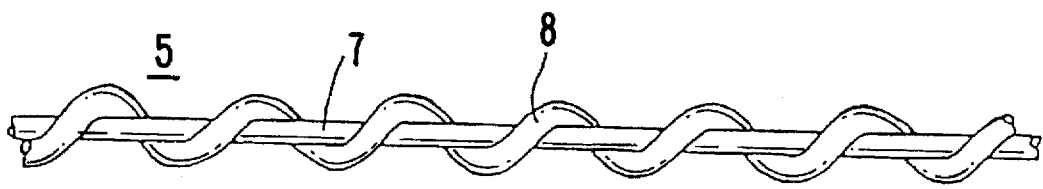
FIG. 4 is a schematic side view of an embodiment of the warp to be used in the tubular woven fabric 4 of the repairing tube 1 of the present invention.

FIG. 4 is a view which schematically shows an embodiment of yarn usable as the warp 5. The warp 5 is composed of covered yarns each formed by spirally turning a synthetic fiber yarn 8, such as an ordinary nylon or polyester fiber yarn, on an elastic yarn 7 such as a polyurethane yarn.

In the embodiment shown in FIG. 4, a covered yarn is shown in which the synthetic fiber yarn 8 is turned once on the elastic yarn. In another embodiment, however, it is also possible to use a double covered yarn in which two synthetic fiber yarns 8 are turned, while crossing each other, on an elastic fiber 7 in a manner such that one yarn is turned in the opposite direction to the direction of the other yarn.

The covered yarn mentioned above is ordinarily in a shrunk state due to the elasticity of the elastic yarn 7. When tensile force is applied thereto, not only the elastic yarn 7 extends but the synthetic fiber can extend by shifting from the spiral to a linear configuration, so that the covered yarn shows high extension under extremely low load.

Furthermore, once the covered yarn has been elongated to a certain length and the synthetic fiber 8 has come to take the linear configuration, the synthetic fiber yarn 8 withstands the tensile load so that the covered yarn no longer extends and can support heavy load.

Furthermore, there may also be used crimped yarns of synthetic fibers as the warp 5 mentioned above. In the case of crimped yarns, in which the filaments constituting the yarns are crimped and hence shrunk lengthwise, they exhibit, upon application of a small amount of force, high extension due to uncrimping, and once they have been elongated to a certain length and uncrimped show no more extension and can support high load.

As the synthetic fiber yarns 8 in the covered yarns mentioned above, there may also be used crimped yarns of synthetic fibers. In this case, the covered yarns gain, in addition to the general extensibility coming from their structure, further extensibility which stems from the fact that the synthetic fiber yarns 8 after having been extended into a linear configuration continue to be extensible due to uncrimping. As a result these covered yarns have extremely high extensibility and once they have been elongated to a certain length the uncrimped synthetic fibers 8 exhibit unstretchability.

As the weft 6 for use in the tubular woven fabric, ordinary unstretchable synthetic fiber yarns are suitable, although the use of stretchable crimped yarns is also preferable in order to comply with possible variations in the inner diameter of the pipe line 2.

According to the present invention, the strength per unit width in the longitudinal direction of the heated repairing tube 1 is preferably not less than 1.3 times the product of the diameter (D) of the pipe line 2 and the pressure (P) of the heated and pressurized fluid to expand the repairing tube 1.

As for the longitudinal pressure resistance of the repairing tube 1, 0.25 DP/unit width or more is theoretically sufficient to withstand the pressure to be applied to the tube on the assumption that the repairing tube 1 is regarded as a thin-walled cylindrical tube. At bend portions of the pipe line 2, however, a large amount of tensile force is imposed on the portion of the repairing tube 1 located in the outer bend region of the pipe line 2 with the result that the tube is elongated correspondingly. The suitable strength of the repairing tube 1 for withstanding such tensile force is 1.3 DP or more.

Since, in the outer bend region of the pipe line 2, the repairing tube 1 withstands the above mentioned tensile force from the internal pressure applied, it becomes necessary for the repairing tube 1 to be properly conformed to the internal wall surface contours of the pipe line 2. For this reason, the longitudinal extension which the repairing tube 1 shows when a load corresponding to 1.3 DP is applied thereto is preferably on the order of 10–30%.

Thus, when the extension of the repairing tube 1 is less than 10%, the repairing tube 1 is not sufficiently elongated in the outer bend region, so that it becomes difficult for the repairing tube 1 to be conformed to the interior wall surface contours of the pipe line 2. If the extension is more than 30%, even extension does not take place all over the tube when the repairing tube 1 is elongated by the internal pressure in the outer bend region of the pipe line, that is, both locally extended and unextended portions are formed, so that unevenness can be given rise to in the wall thickness of the repairing tube 1.

In manufacturing the repairing tube 1, a tubular woven fabric 4 is placed inserted in an extruder, synthetic resin is first extruded onto the exterior surface, and then forced through the meshes into the interior of the tubular woven fabric 4, thereby integrating both inside and outside of the tubular woven fabric 4 by way of the synthetic resin coating. There is thus manufactured the repairing tube 1 composed of a rigid pipe 3 having the tubular woven fabric 4 embedded therein.

Figure 5:
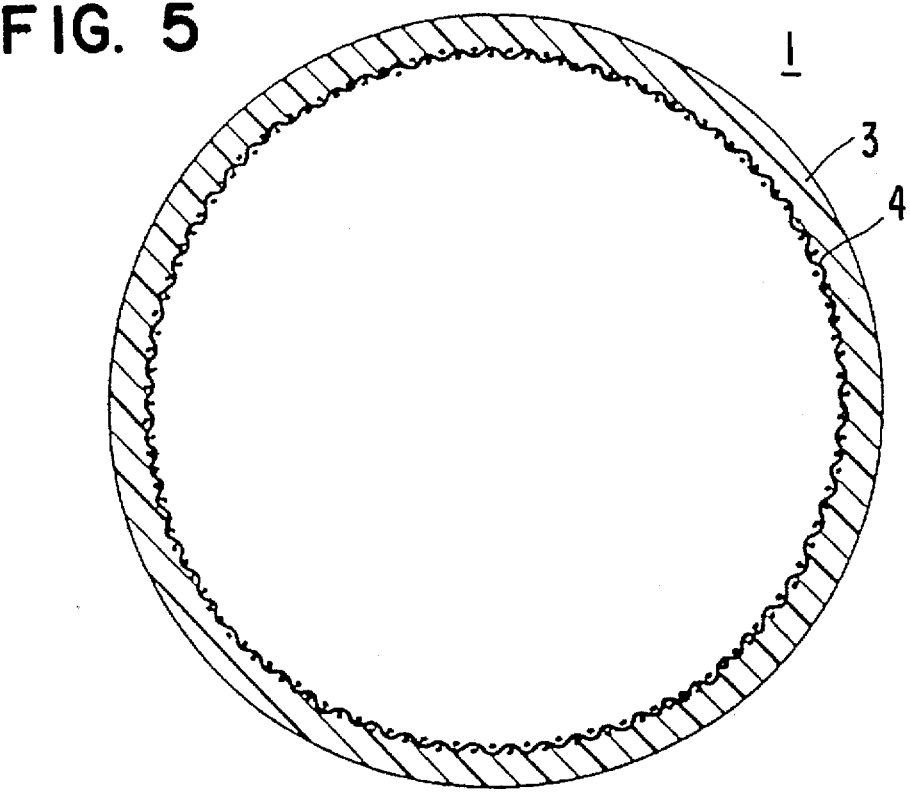
FIG. 5 is a transverse cross section of another embodiment of the repairing tube 1 of the present invention.
Figure 6:
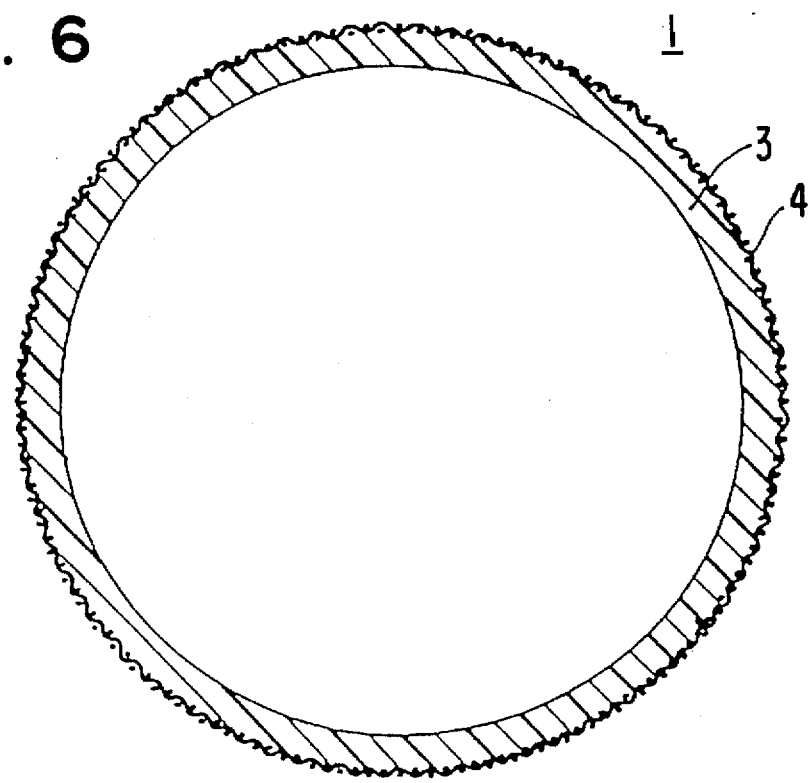
FIG. 6 is a transverse cross section of another embodiment of the repairing tube 1 of the present invention.

FIG. 5 is a transverse cross section of another embodiment of the repairing tube 1 of the present invention. In this embodiment, the tubular woven fabric 4 is arranged on the interior wall surface of the rigid pipe 3. FIG. 6 is a transverse cross section of another embodiment of the repairing tube of the present invention. In this embodiment the tubular woven fabric 4 is arranged on the exterior wall surface of the rigid pipe 3. In either embodiment, the tubular woven fabric 4 is integrated with the rigid pipe 3.

Figure 7:
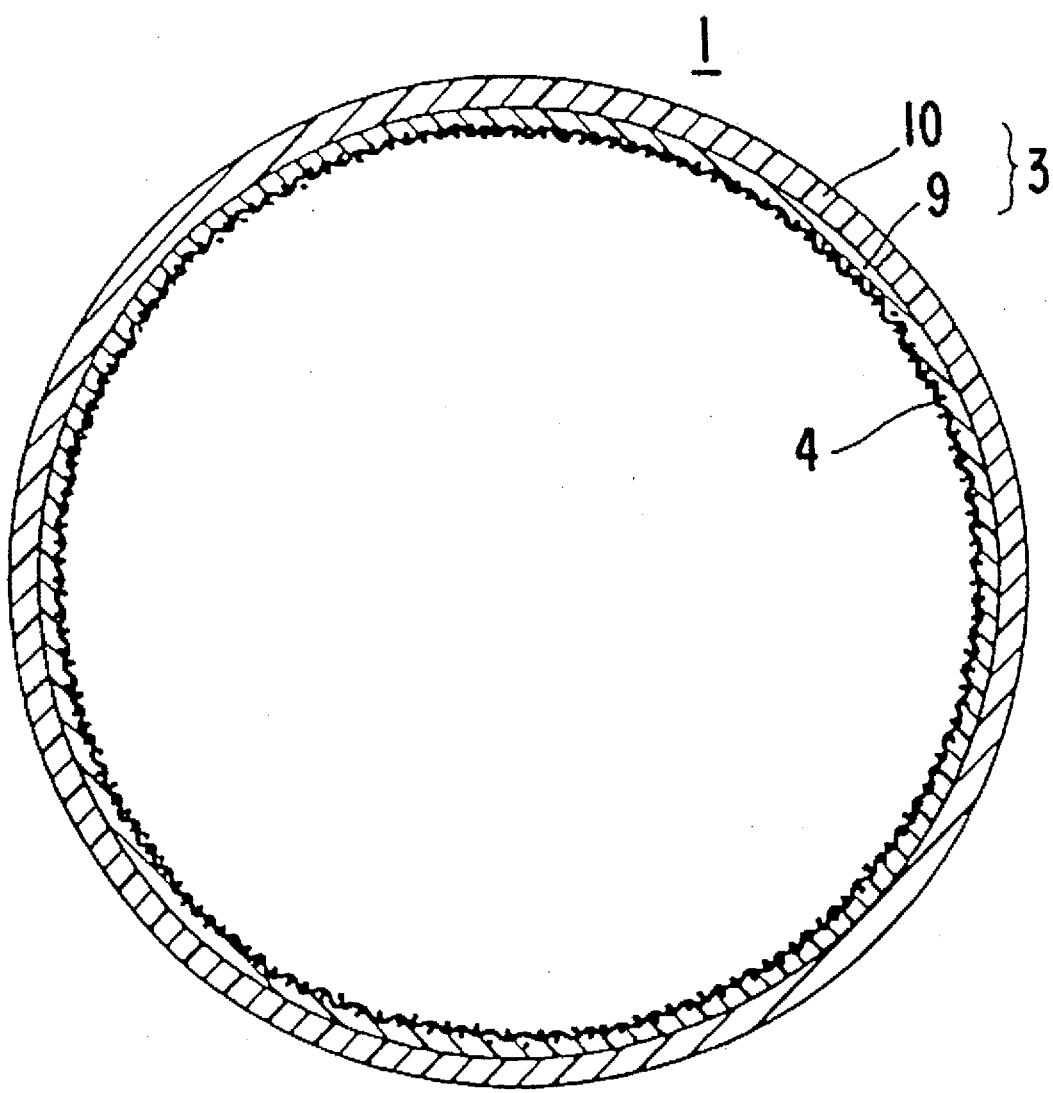
FIG. 7 is a transverse cross section of a further embodiment of the repairing tube 1 of the present invention.

FIG. 7 is a transverse cross section of a still further embodiment of the repairing tube 1 of the present invention. In this embodiment, the repairing tube 1 is comprised of a rigid pipe 3 composed of an inner resin layer 9 and outer resin layer 10 formed in each case of thermoplastic resin and a tubular woven fabric 4 integrated with the inner resin layer 9 by being overlaid onto the interior wall surface of the inner resin layer 9. As the thermoplastic resin forming the inner resin layer 9, there may used any resin which has a softening point higher than the temperature of the heated and pressurized fluid to be fed into the repairing tube 1 inserted in the pipe line 2. As the thermoplastic resin forming the outer resin layer 10, there may be used any resin which has a softening point lower than that of the thermoplastic resin forming the inner resin layer 9.

The softening point of the thermoplastic resin forming the outer resin layer 10 is preferably lower than the temperature of the heated and pressurized fluid to be fed into the repairing tube 1, but is by no means limited thereto. Thus it may be slightly higher than the temperature of the heated and pressurized fluid so long as it is lower than the softening point of the thermoplastic resin forming the inner resin layer 9.

Suitable examples for use as the thermoplastic resin or as the heated and pressurized fluid are as follows: high density polyethylene having a softening point of about 126° C. as the thermoplastic resin forming the inner resin layer 9; linear low density polyethylene having a softening point of about 114° C. as the thermoplastic resin forming the outer resin layer 10; and pressurized steam at about 121° C. under 1.0 kg/cm$^2$ as the heated and pressurized fluid.

In manufacturing the repairing tube of this type, the tubular woven fabric 4 is inserted into the head of an extruder; a thermoplastic resin to form the inner resin layer 9 is extruded onto the exterior surface of the tubular woven fabric 4, whereby the exterior surface of the tubular woven fabric 4 is coated with the synthetic resin; and another thermoplastic resin to form the outer resin layer 10 is then extruded and applied onto the exterior surface of the thus integrated product to form the repairing tube 1.

Figure 8:
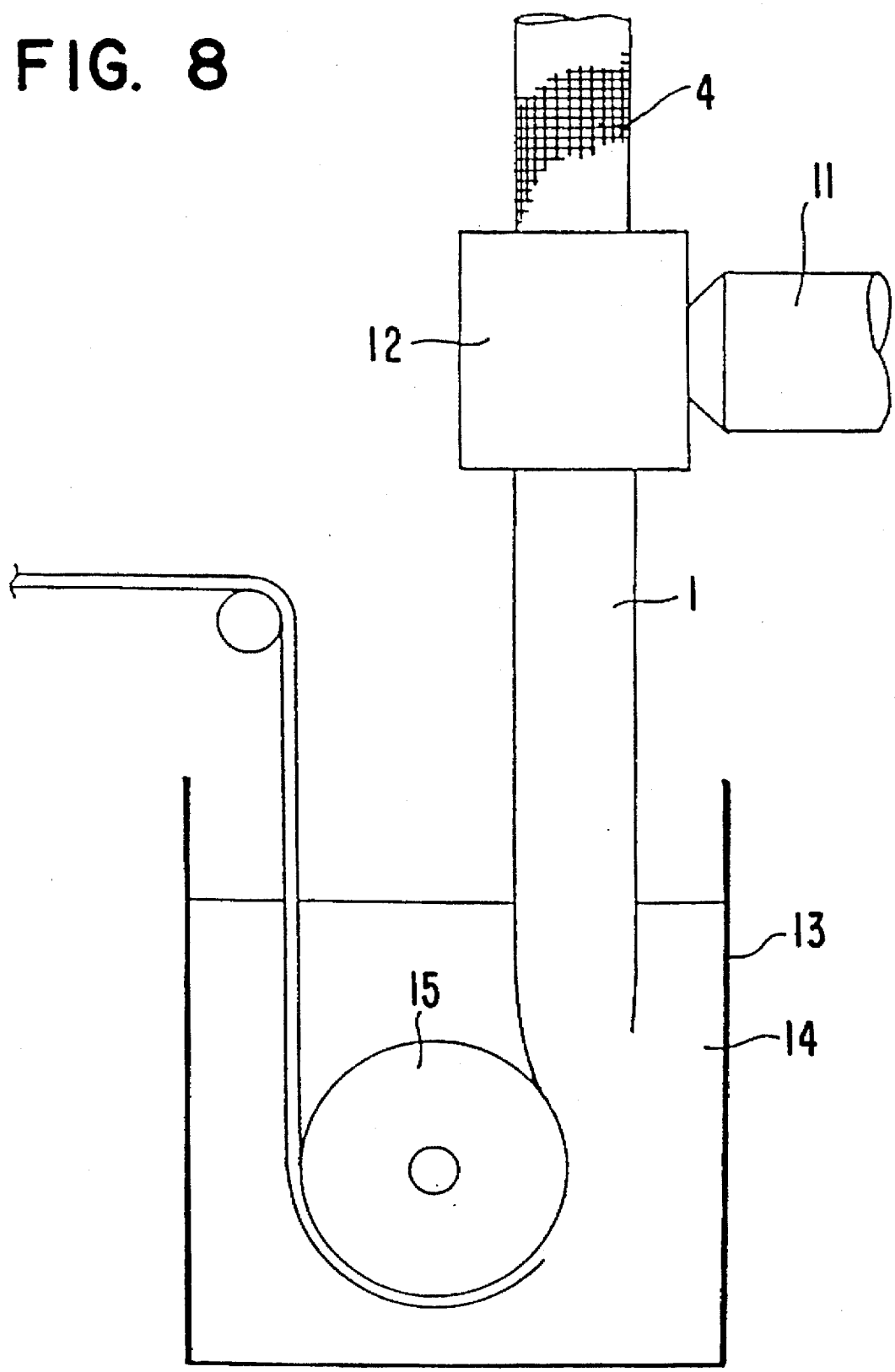
FIG. 8 is a view showing an embodiment of the repairing tube 1 of the present invention being molded.

Some embodiments of method for forming the repairing tube 1 of the present invention and inserting the repairing tube 2 into a pipe line 2 to form the pipe line 2 lined with the repairing tube 14 will now be illustrated in the following with reference to the drawings. FIG. 8 is a view showing the repairing tube 1 of the present invention being molded. The reference numeral 11 designates an extruder and 12 a die of the extruder 11.

The reference numeral 4 designates a tubular woven fabric supplied from above the die 12, and a thermoplastic resin is extruded through the die 12 onto both interior and exterior surfaces of the tubular woven fabric 4, whereby an unhardened repairing tube 1 of cylindrical configuration is formed.

Figure 9:
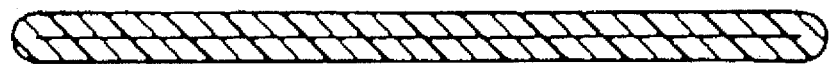
FIG. 9 is a transverse cross section of the repairing tube 1 in its flattened state.

The repairing tube 1 extruded out of the die is then introduced into a water tank 13, in which it is cooled with warm water 14 and directed in the opposite direction, while being flattened as shown in FIG. 9, by way of a roller 15 arranged in the water tank 13.

Temperatures at which the repairing tube 1 is flattened should be in the vicinity of the Vicat softening point of the thermoplastic resin used. When linear low density polyethylene (Vicat softening point 114° C.) is used as the thermoplastic resin, it is suitable to perform the flattening at a temperature on the order of 114°±10° C.

If the temperature for the flattening operation is too high, then there strongly remains the memory of returning to the flattened state after the repairing tube 1 has been heated and expanded, so that the repairing tube 1 is unable to withstand external pressure. If the flattening operation is performed while cooling down to too low a temperature, then a large force is needed therefor and the thermoplastic resin forming the repairing tube 1 is cracked.

The repairing tube 1 thus flattened over the roller 15 is then cooled in, and pulled out of, warm water 14, whereafter it is wound on a winding roll (not shown) before it is presented for insertion into pipe lines 2.

Figure 10:
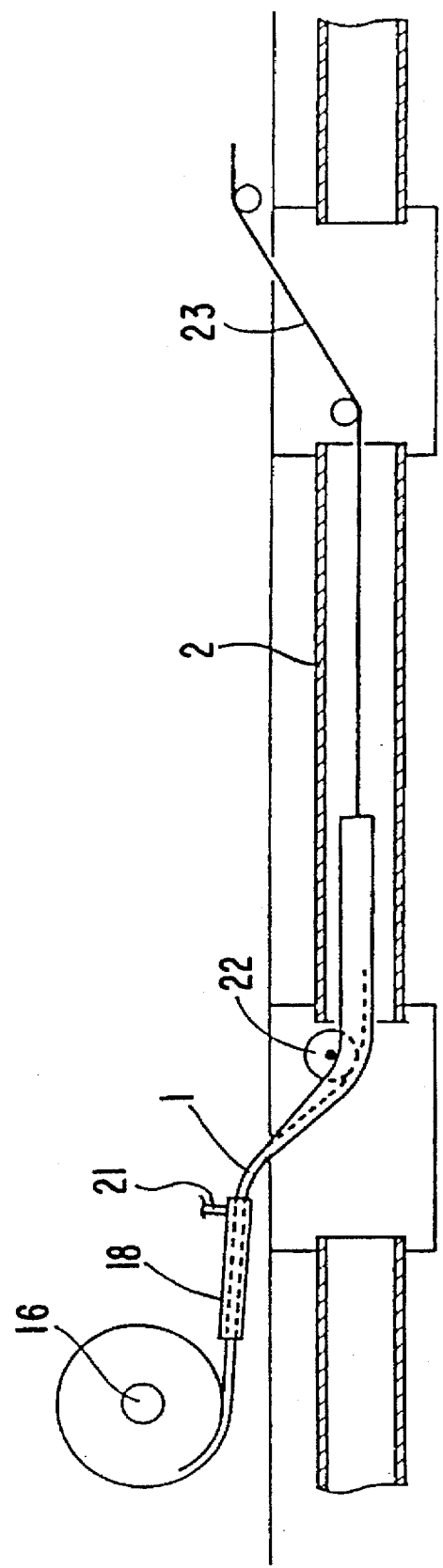
FIG. 10 is a longitudinal section of an embodiment of the repairing tube 1 of the present invention being bent and pulled into a pipe line 2.

FIG. 10 is a view showing the repairing tube 1 being inserted into a pipe line 2. In FIG. 10, the repairing tube 1 is wound on a reel 16 in its flattened state.

Figure 11:
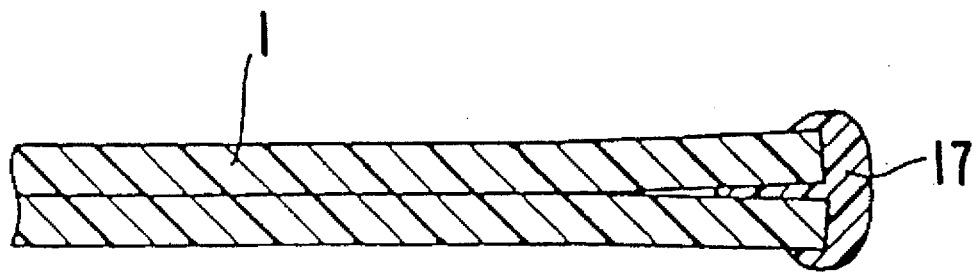
FIG. 11 is an end longitudinal section of an embodiment of the end portion in the sealed state of the repairing tube 1 of the present invention.

As shown in FIG. 11, both ends of the repairing tube 1 are air-tightly sealed with a filler 17. Means for sealing the end portions of the repairing tube 1 is not limited to fillers and other sealing means may be used so long as the repairing tube 1 can be sealed air-tightly, that is, in a manner such that outside air cannot flow into the tube.

Figure 12:
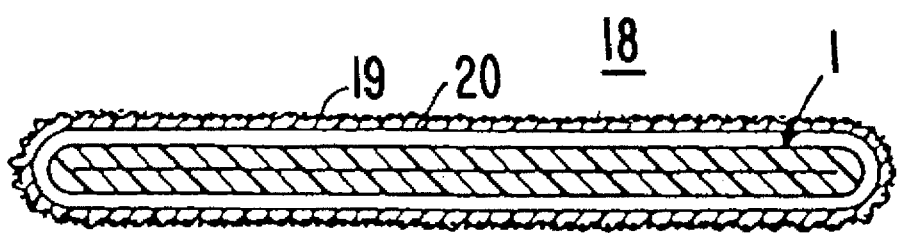
FIG. 12 is a transverse cross section of the heating apparatus 18 shown in FIG. 10.

As shown in FIG. 10, the repairing tube 1 withdrawn from the reel 16 is then heated by being passed through heating apparatus 18. The heating apparatus 18 is comprised, as shown in FIG. 12, of a flexible tubular structure composed of a tubular woven fabric 19 of flat configuration the interior wall surface of which has a coating layer 20 of soft rubber or synthetic resin formed thereon, and the tubular structure is provided somewhere with an inlet tube 21 for heated fluid.

The repairing tube 1 is heated by inserting it in its flattened state into the heating apparatus and then feeding steam through the inlet tube 21 for heated fluid into the interspace between the repairing tube 1 and the heating apparatus 18.

Temperatures to which the repairing tube 1 is to be heated should be ones which are well below the Vicat softening point of the thermoplastic resin and at which the thermoplastic resin is deformable. Where linear low density polyethylene is used as the thermoplastic resin, suitable temperatures are in the range of 80°–90° C.

The repairing tube 1 which has left the heating apparatus is then bent, while kept in its flattened state, into an approximately V- or U-shaped cross section by using a roller 22 to push the central portion of the repairing tube 1, as shown in FIG. 10. The repairing tube 1 which has thus been bent into an approximately V- or U-shaped cross section is then inserted into the pipe line 2. The insertion of the repairing tube 1 into the pipe line 2 can be performed by attaching a pulling line 23 which has been inserted beforehand into the pipe line 2 to the leading end of the repairing tube 1 and then pulling the pulling line 23 from the opposite side of the pipe line 2 to the side from which the repairing tube 1 is inserted into the pipe line 2.

Since it has been bent into an approximately V- or U-shaped cross section and hence has, as shown in FIG. 1, a dimension smaller than the inner diameter of the pipe line 2, the repairing tube can be easily inserted into the pipe line 2 without producing excessive friction resistance vis-a-vis the interior wall surface of the pipe line 2.

Furthermore, since the repairing tube 1 has been heated in the heating apparatus 18 to a temperature at which it is deformable and therefore is in a deformable state, it can be inserted into pipe lines 2 even with some bends while being bent along the contours of the bends.

Once the repairing tube 1 has been inserted in the pipe line 2 over the entire length thereof, pressurized steam is fed into the repairing tube 1 to heat, and apply internal pressure to, it thereby to expand the tube into a cylindrical configuration so that it conforms to the internal wall surface contours of the pipe line 2. In performing this, the repairing tube 1 should be heated to a temperature sufficiently higher than that temperature to which the tube has previously been heated in the heating apparatus 18. By means of this heating, the repairing tube 1 can be freed of residual stress due to the bending thereof into an approximately V- or U-shaped cross section. If the heating is insufficient, the residual stress remains in the repairing tube 1, so that the tube is unable to withstand external pressure to be applied during its application.

Furthermore, although it is preferred to heat the repairing tube 1, which is originally of cylindrical configuration, to a temperature equal to or higher than its Vicat softening point so that any memory gained through its being flattened may be eliminated, it is not necessarily indispensable to do so. It is, indeed, difficult to heat the repairing tube 1 inserted in the pipe line 2 to such a high temperature because of heat loss from the exterior surface of the tube through the pipe line 2.

Figure 13:
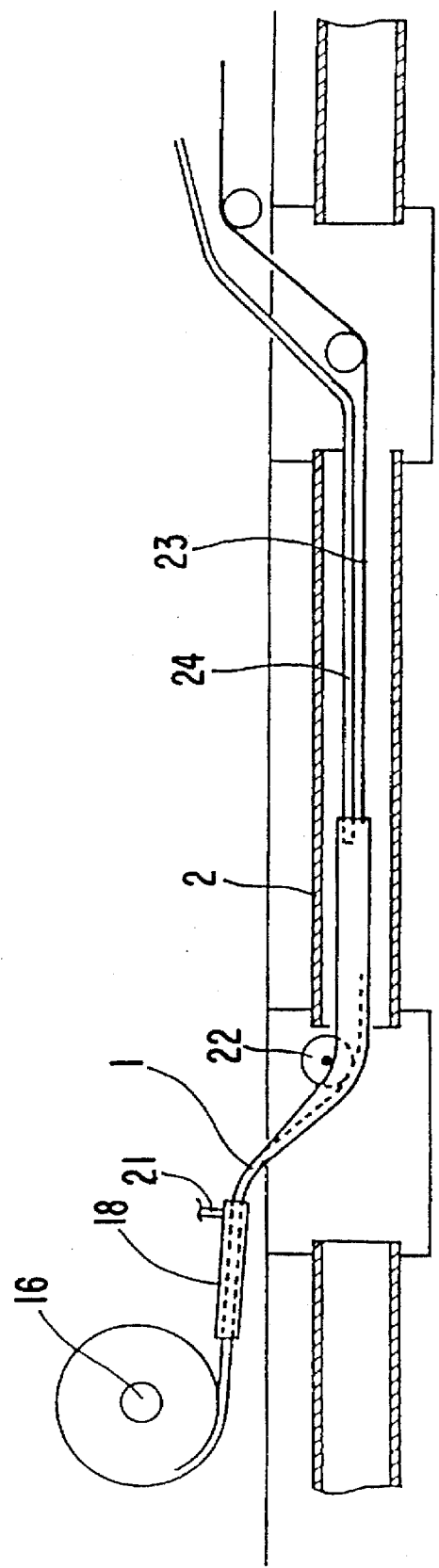
FIG. 13 is a longitudinal section of an embodiment of the repairing tube 1 of the present invention being pulled into a pipe line 2.

FIG. 13 is a view showing another embodiment of method for inserting the repairing tube 1 of the present invention into a pipe line 2. The repairing tube 1 unwound from a reel 16 is, after the tip of hose 24 having previously inserted in the pipe line 2 is inserted into the leading end of the tube, air-tightly sealed and then attached to the tip of a pulling line 23.

The interior of the repairing tube 1 is evacuated through the hose 24. When the pulling line 23 is pulled from the opposite end of the pipe line 2 to the end from which the repairing tube 1 is inserted into the pipe line 2, the repairing tube 1 is withdrawn from the reel 16, softened in heating apparatus 18, bent while kept in its flattened state into an approximately V- or U-shaped cross section and then inserted into the pipe line 2. Although in this embodiment the repairing tube is evacuated from its leading end, it is also possible to evacuate it from its tail end by way of the winding core of the reel 16. Furthermore, in this method it is preferred to evacuate the repairing tube 1 from its one end while air-tightly sealing the other end. The other end, however, needs not necessarily to be sealed, since any air coming in therethrough is also removed through the evacuation.

Once the repairing tube 1 has thus been inserted in the pipe line 2 over the entire length thereof, pressurized steam is fed into the repairing tube 1 to heat, and to apply internal pressure to, the tube expands to a cylindrical configuration so that it conforms to the internal wall surface contours of the pipe line 2, as is the case with the previous embodiment.

Figure 14:
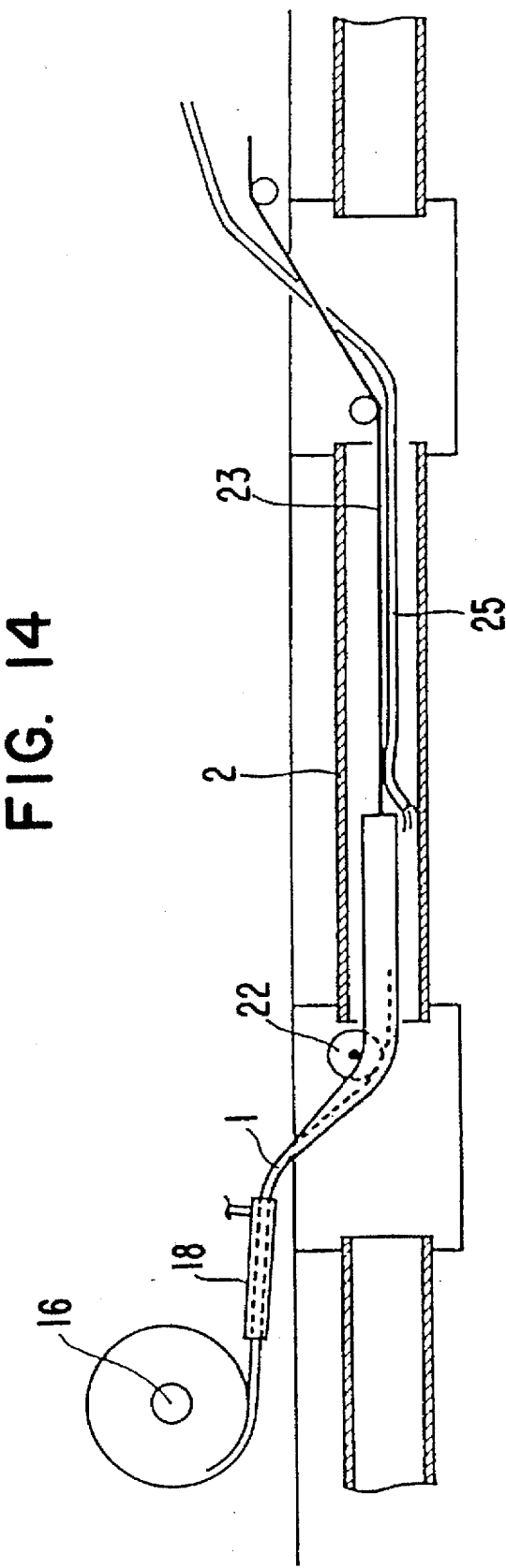
FIG. 14 is a longitudinal section of another embodiment of the repairing tube 1 of the present invention being pulled into a pipe line 2.

FIG. 14 is a view showing another embodiment of method for inserting the repairing tube 1 into a pipe line 2.

In this embodiment a pulling line 23 inserted in the pipe line 2 is attached to the leading end of the repairing tube 1 which has been bent into an approximately V- or U-shaped cross section and a hose 25 is inserted, in parallel with the pulling line 23, in the pipe line with the tip of the hose 25 being positioned at the leading end portion of the repairing tube 1.

A heated fluid such as steam is then fed from the tip of the hose 25 into the interspace between the repairing tube 1 and the pipe line 2 to heat the repairing tube, while pulling the repairing tube 1 into the pipe line 2 using the pulling line 23.

Figure 15:
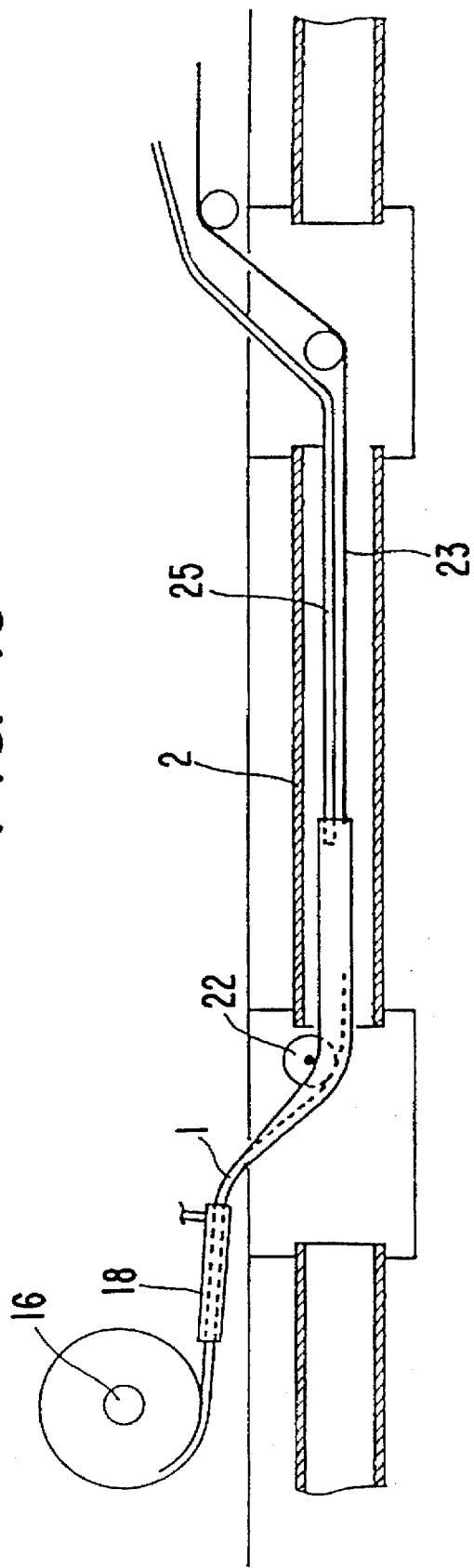
FIG. 15 is a longitudinal section of a further embodiment of the repairing tube 1 being pulled into a pipe line 2.

FIG. 15 is a view of a further embodiment of the present invention. In this embodiment, the tip of the hose 25 is inserted in the leading end of the repairing tube 1. A heated fluid is fed from the hose 25 into the repairing tube 1 to heat it while pulling the repairing tube 1 into the pipe line 2 using the pulling line 23.

Figure 16A:
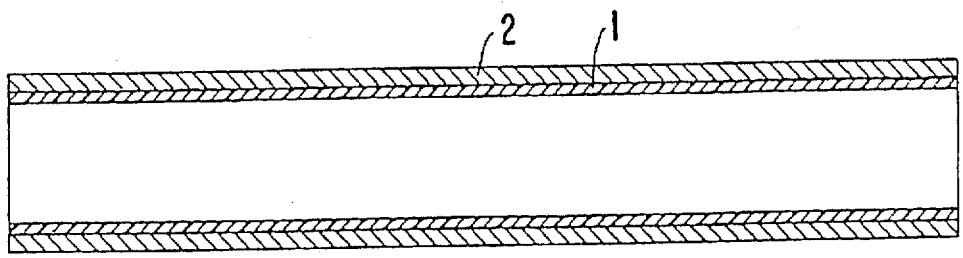
FIG. 16(a) is a view in section of a pipe line 2, the interior wall surface of the pipe line 2 being lined with the repairing tube 1.

The method for removing the repairing tube 1 from a pipe line 2 lined therewith will now be explained with reference to the drawings. FIG. 16 shows the step of deforming the tube, within the pipe line lined therewith, into a reduced cross section. FIG. 16(a) is a view of the lined pipe line, in which the reference numeral 2 designates the pipe line and 1 the tube inserted into the pipe line 2 along the internal wall surface contours thereof. FIG. 17 is a transverse cross section of the lined pipe line 2.

Figure 16B:
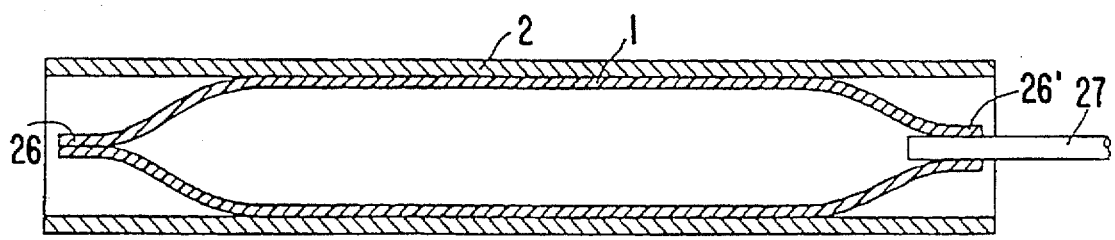
FIG. 16(b) is a view in section of the repairing tube 1, one end thereof being sealed and the interior thereof being evacuated to a reduced pressure through the other end of the tube 1.
Figure 17:
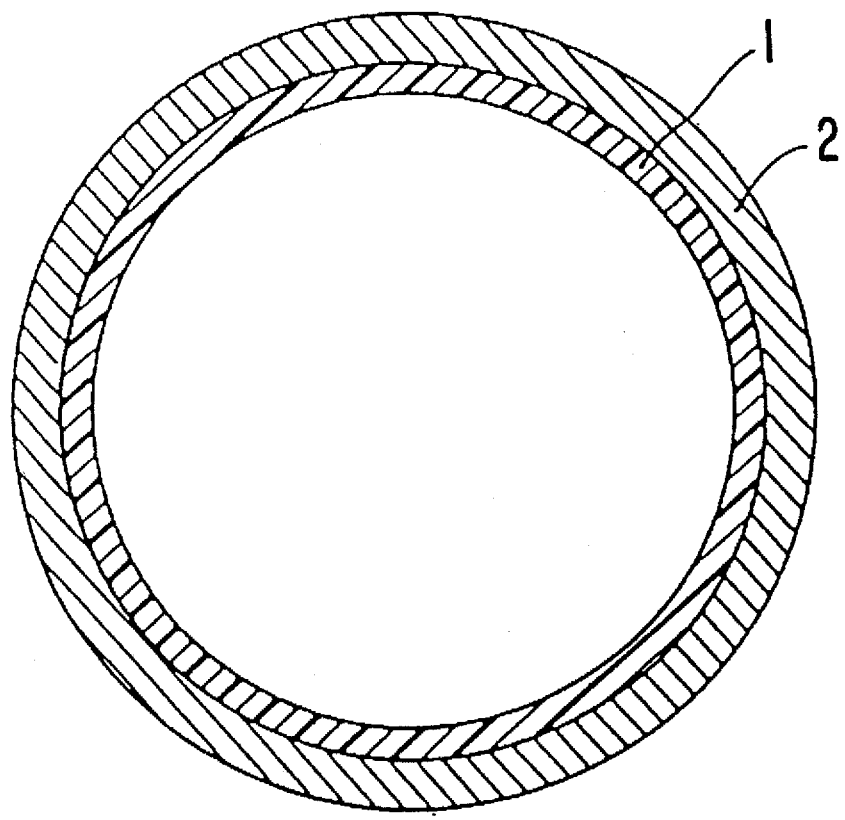
FIG. 17 is a central longitudinal section of a pipe line 2, the interior wall surface of the pipe line 2 being lined with the repairing tube 1.

FIG. 16(b) shows the repairing tube 1, the end portions 26, 26' of which are peeled from the interior wall surface of the pipe line 2, one end 26 being collapsed and heat sealed for air-tight closure and the other end 26' being communicated with the tip of the hose 27 connected to a vacuum pump (not shown).

Figure 16C:
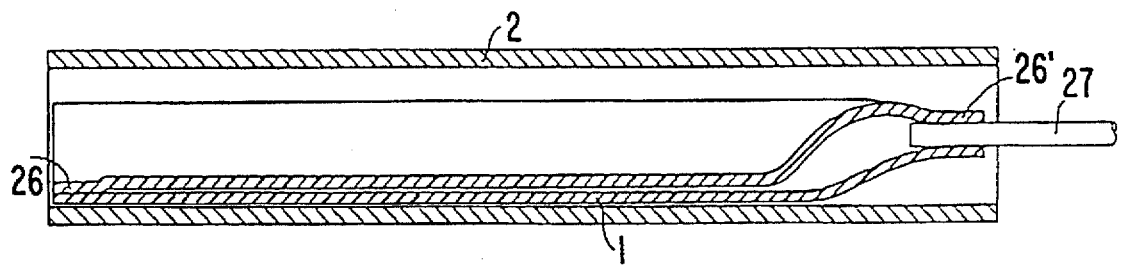
FIG. 16(c) is a view in section of the repairing tube 1 collapsed as a result of the pressure reduction in the interior thereof.

When the interior of the repairing tube 1 is evacuated through the hose 27 using the vacuum pump, the repairing tube is deformed into a collapsed state with a reduced cross section, as shown in FIGS. 16(c) and 1. The repairing tube 1 in this state can be easily withdrawn from the pipe line 2 by pulling either one end of the tube.

Since the repairing tube 1 is usually formed of thermoplastic resin such as rigid polyethylene or polyvinyl chloride and hence is of considerable rigidity, it can be difficult to collapse it only by evacuation of its interior. In such cases it is preferred to heat and soften the repairing tube 1 by feeding a heated fluid into the repairing tube 1 prior to the evacuation or by feeding a heated fluid, while carrying out the evacuation, into the interspace between the repairing tube 1 and the pipe line 2.

Figure 18A:
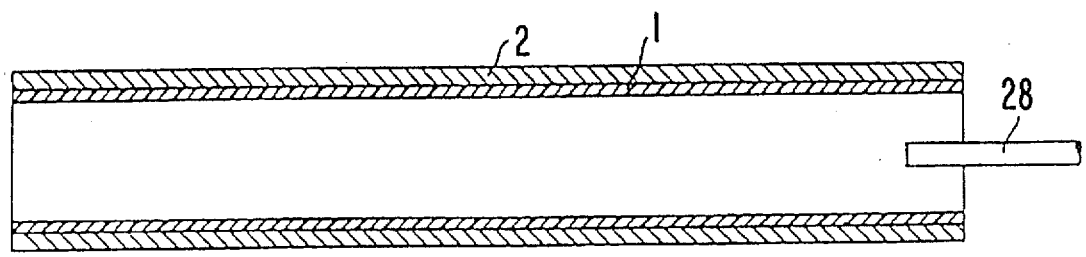
FIG. 18(a) is a view in section of the repairing tube 1 installed in a pipe line 2, which tube is filled with pressurized steam.

FIG. 18 shows another embodiment of the present invention. Thus, in FIG. 18(a), pressurized steam is fed through the hose 28 into the repairing tube 1 lining the pipe line 2, whereby the repairing tube 1 is filled with the pressurized steam and heated and softened at the same time.

Figure 18B:
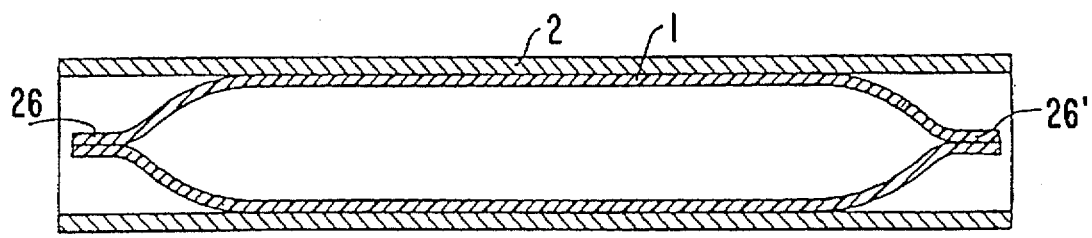
FIG. 18(b) is a view in section of the repairing tube filled with pressurized steam, both ends of which are sealed.
Figure 18C:
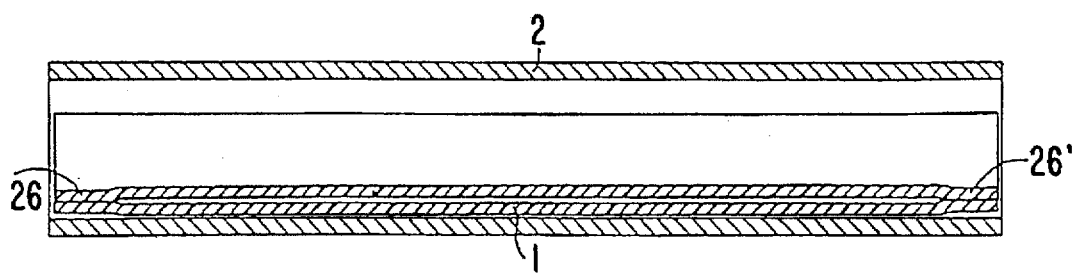
FIG. 18(c) is a view in section of the repairing tube 1 which has been deformed into a reduced dimension as a result of the condensation of the pressurized steam in the interior thereof.

After the repairing tube 1 has been sufficiently heated and sufficiently filled with the pressurized steam, the end portions 26, 26' of the repairing tube are peeled, as shown in FIG. 18(b), from the pipe line 2 and respectively sealed in air-tight manner. As the pressurized steam in the sealed repairing tube 1 cools down and hence condenses, the repairing tube 1 is deformed, as shown in FIGS. 18(c) and 1, into a collapsed state with a reduced cross section. The repairing tube 1 in this state can be easily withdrawn from the pipe line by pulling either one end of the tube.

Effects:

Since in the repairing tube 1 of the present invention the rigid pipe 3 and the tubular woven fabric 4 are integrated together as shown in FIGS. 2, 5 and 6, the rigid pipe 3 and the tubular woven fabric 4 are expanded in one body upon application of pressure. Furthermore, since little radial expansion takes place in the tubular woven fabric 4 upon application of pressure, no local expansion is caused to occur and even expansion is achieved all over the tube even when there are some unevenly softened portions in the rigid pipe 3, with the result that close conformance of the tube to the pipe line 2 is achieved.

When a repairing tube 1 of the prior art is inserted, while kept in a flattened and folded condition, into a pipe line 2 and a heated and pressurized fluid is fed into the repairing tube 1, insufficient heating takes place at the folds to cause insufficient softening there, so that the tube is expanded with difficulty into a cylindrical configuration. In contrast, in the case of the repairing tube of the present invention where sufficient internal pressure can be applied without causing any excessive expansion, expansion into a cylindrical configuration as well as close conformance to the pipe line 2 can be ensured even in the presence of insufficiently softened portions.

Figure 19:
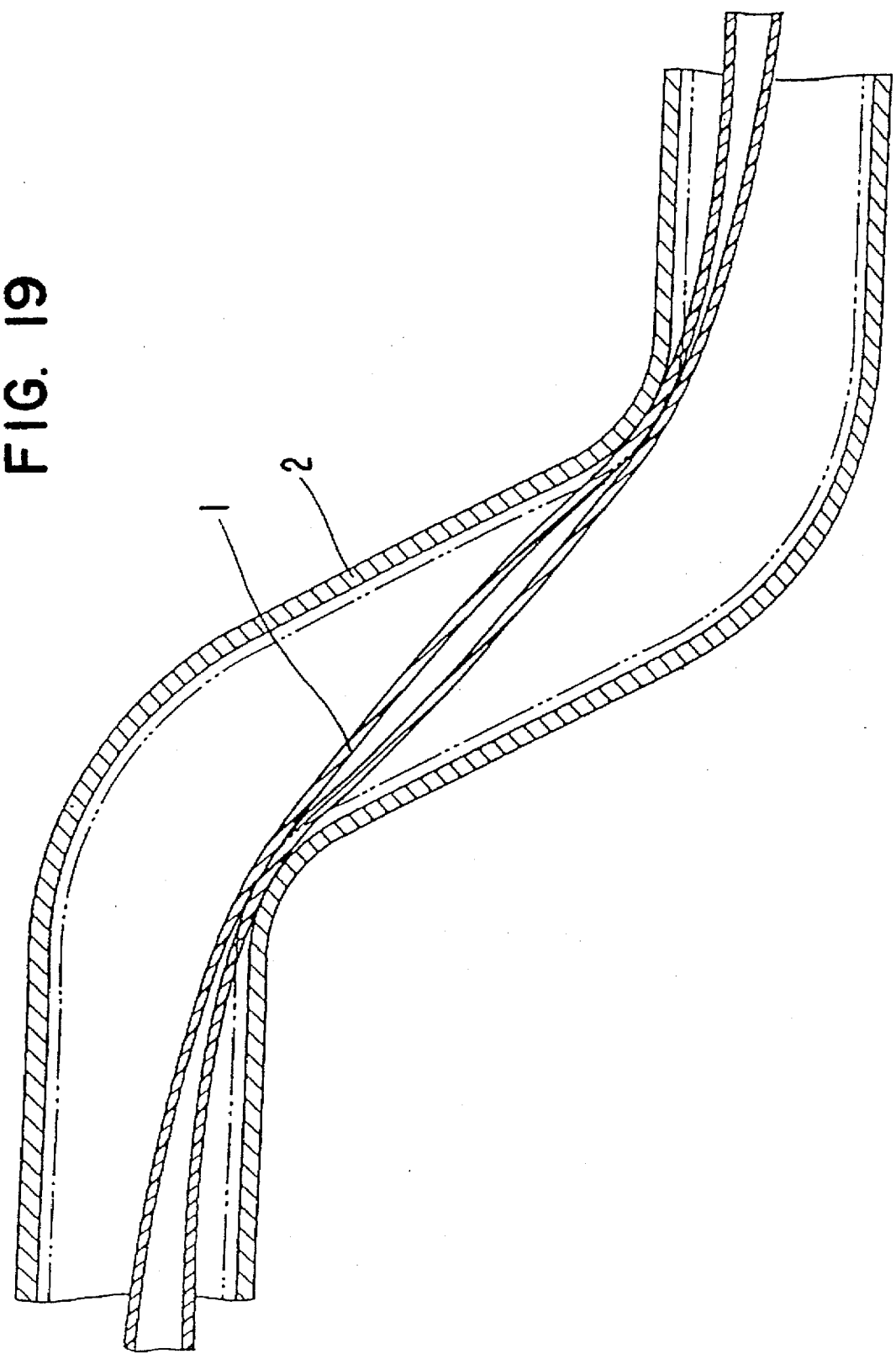
FIG. 19 is a central longitudinal view of a pipe line 2 with a bend portion into which the repairing tube 1 of the present invention is inserted.
Figure 20:
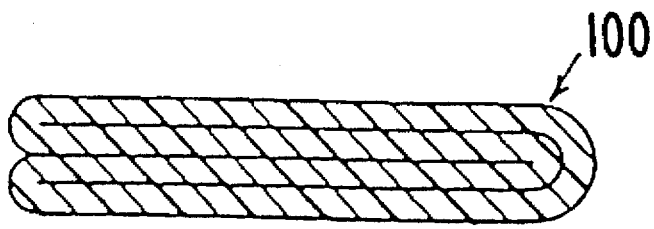
FIG. 20 is a transverse cross section of a synthetic resin pipe 100 used in the prior art.
Figure 21:
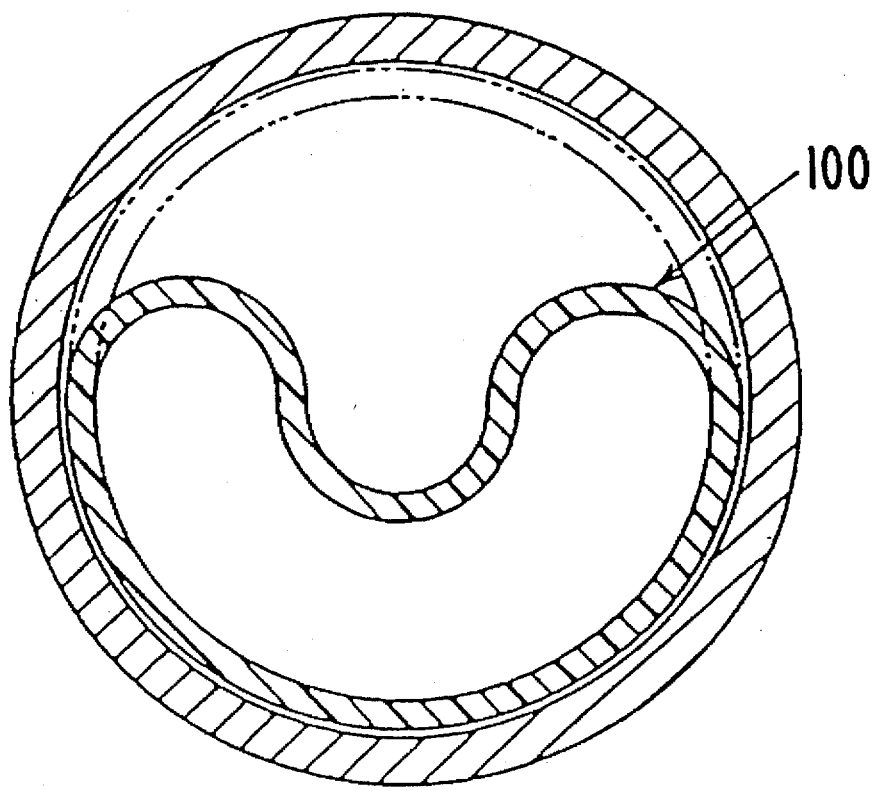
FIG. 21 is a transverse cross section of a pipe line lined with a prior art pipe which has been collapsed into an approximately U-shaped configuration due to external pressure applied thereto.

The repairing tube 1 of the present invention is first bent or folded, while kept in a flattened state, into an approximately U- or V-shaped transverse cross section and then inserted into the pipe line 2. In this operation of the repairing tube 1, the rigid pipe 3 formed of rigid thermoplastic resin plays the major role and withstands the tension load caused when the tube is pulled. Although the rigid pipe 3 is more or less elongated by tensile force, the extent of the elongation is small and no excessive elongation takes place.

Where the pipe line 2 has bends, the repairing tube 1 is, as shown in FIG. 19, is caused to run, because of its tension, along the inner bend region of the pipe line 2.

When a heated and pressurized fluid such as pressurized steam is charged into the repairing tube 1 in this condition, the repairing tube 1 is heated and softened and inflated by internal pressure from its flattened state to a cylindrical configuration until it is urged onto the interior wall surface contours of the pipe line 2. At this point of time, the repairing tube 1 is positioned along the inner bend portion of the pipe line 2. When the repairing tube in this condition is expanded by application of internal pressure, a tensile force is caused to act in the outward direction with respect to the bends of the pipe line and the repairing tube 1 is easily elongated because it is heated by the heated and pressurized fluid whereby the rigid pipe 3 is softened. In addition, the tubular woven fabric 4 integrated with rigid pipe 3 is able to show a large extension by a small amount of force thanks to the above described characteristics of the warp 5.

Since both rigid pipe 3 and tubular woven fabric 4 can thus be extended by a small amount of force, the repairing tube 1 is able, as it expands in the outward direction with respect to the bends of the pipe line 2, to extend in the longitudinal direction, thereby to conform, all over the pipe line, to the interior wall surface contours thereof.

In general, at a bend of a pipe line 2, the length of bend in its outer bend region is about twice as long as that in its inner bend region, whereas the repairing tube 1 extends only 10–30% when loaded with 1.3 DP, as mentioned above. It is therefore impossible for the repairing tube 1 to be conformed at bends to the interior wall surface contours of the pipe line 1 only by relying on the extensibility of the repairing tube 1.

However, when internal pressure is applied to the repairing tube 1, a tensile force is caused to act on the bend in the outward direction. By this tensile force, the bend portion of the repairing tube is extended, while the straight portion thereof following the bend portion is also extended accompanying this extension.

As a consequence, since, although the extension percentage of the repairing tube 1 itself is as low as 10–30%, an extended range of the tube including its bend portion located in the bend region of a pipe line 2 is to be extended, an amount of tube extension can be obtained which is equivalent to the difference between the lengths of bend in the inner and outer bend regions of the pipe line, whereby a close conformance to the interior wall surface contours of the pipe line 2, as depicted in FIG. 19 by the chain line, is achieved.

Although the repairing tube 1 can extend both in bend regions and straight regions of pipe lines so long as the amount of extension is low, the warp 5 of the tubular woven fabric 4, when the amount of extension exceeds a certain level, comes to its limit of extension and hence can no longer extend any further, whereby further tensile force can be withstood.

In a state-of-the-art resin pipe 100 inserted in a pipe line having a bend therein, cracking of the pipe can take place in the outer bend portion because of the wall thickness of the extended resin pipe 100 becoming too thin, and also in the inner bend portion because of occurrence of wrinkles. In contrast, in the repairing tube 1 of the present invention in which the rigid pipe 3 is reinforced by the tubular woven fabric 4, there occurs neither formation of too thin parts from partial extension in the outer bend portion, nor occurrence of cracking in wrinkles in the inner bend portion.

Furthermore, in the repairing tube 1 of the present invention, even when a high internal pressure is applied for its expansion, the tubular woven fabric 4 is to withstand the tension from the internal pressure, so that any high pressure will not act directly on the pipe line 2, thus causing no damage in the pipe line 2.

In accordance with the present invention, even where there is a difference in length of bend between the outer and inner bend regions of a pipe line 2, the outer bend portion of the repairing tube 1 will be extended by internal pressure so that it conforms to the outer bend portion of the pipe line 2, and no wrinkles occur because no over-abundance occurs in the inner bend portion of the repairing tube 1.

As a consequence, the repairing tube 1 is by no means excessively extended locally, so that any portion thereof cannot be extremely thinned or broken.

In the present repairing tube 1 shown in FIG. 7, no peeling off of the tubular woven fabric 4 takes place even when a heated and pressurized fluid is fed into the repairing tube 1, since the inner resin layer 9 close to the interior surface of the repairing tube 1, due to its softening point being higher than the temperature of the heated and pressurized fluid, cannot be excessively softened or excessively lowered in strength. Because of this and also because of the outer resin layer 10 having a softening point lower than that of the inner resin layer 9, the rigid pipe 3 as a whole is sufficiently softened.

Thus, since the rigid pipe 3 and the tubular woven fabric 4 are integrated together to form the repairing tube 1, the pipe 3 and the fabric 4 are expanded in one body upon application of pressure using a heated and pressurized fluid. Furthermore, the application of pressure causes little radial expansion of the tubular woven fabric 4 and no separation of the tubular woven fabric 4 from the inner resin layer 9. Because of this, there occurs neither unevenness in the degree of softening in the rigid pipe 3 nor local expansion even at bends in the pipe line 2. As a consequence, the repairing tube 1 is evenly expanded in its entirety, thus conforming to the interior wall surface contours of the pipe line 2.

Furthermore, according to the method, of the present invention, the cylindrical-shaped repairing tube 1 is flattened at a temperature in the vicinity of its Vicat softening point, so that it may be easily wound on a reel and handled in compact form as a flat belt-like article. In addition, the repairing tube 1 is flattened but, unlike repairing tubes made by hitherto known methods, not folded double, so that it will not retain any shape memory.

As shown in FIG. 1, the repairing tube 1 can be easily inserted into the pipe line 2 since the insertion is carried out after the tube has been heated and bent, while kept in a flattened condition, into an approximately V- or U-shaped cross section and hence into a reduced cross section.

Furthermore, although some distortion is caused to occur temporarily when the repairing tube 1 is deformed into an approximately V- or U-shaped cross section, it can be eliminated subsequently by heating the repairing tube 1 to a temperature higher than that at which to bend the tube. As a consequence, the repairing tube can be expanded in such a distortion-free condition by application of internal pressure and hence conformed, in its entirety, to the interior wall surface contours of the pipe line 2.

By heating the repairing tube 1 having been inserted in the pipe line 2 to a temperature equal to or higher than the above-mentioned Vicat softening point, any shape memory including one gained when the repairing tube 1 is flattened can be eliminated. Memory acquired upon being flattened will remain if the heating temperature is below the Vicat softening point.

Even if there arises a deformation tendency in the repairing tube 1 to return to its original flattened condition, any outward protrusion is to be suppressed by the interior wall surface of the pipe line, so that the repairing tube 1 cannot return to its flattened condition and is therefore retained in its cylindrical configuration.

Thus, even if there remains the memory of returning to the flattened configuration, the repairing tube 1 will by no means be collapsed upon application of external pressure so long as the memory coming from being bent into an approximately V- or U-shaped cross section has been eliminated. Furthermore, both ends of the repairing tube 1 are air-tightly sealed as shown in FIG. 11, so that no outside air cannot flow into the repairing tube 1.

Thus, even if the repairing tube 1 is heated and softened in heating apparatus 18 as described above and is thereby caused to manifest its shape-memory leading to expansion into a spindle-like cross section, there occurs no further expansion because any air needed to further inflate the repairing tube 1 with the spindle-like cross section cannot flow into the tube 1 through its ends.

In the method of the present invention as shown in FIG. 13, the interior of the repairing tube 1 is positively evacuated with a hose 24 to a reduced pressure. As a consequence of this evacuation, the repairing tube 1, which would otherwise be expanded into a spindle-like cross section, is prevented from being so expanded.

In the present methods shown in FIGS. 14 and 15, the tip of a hose 25 is positioned at the leading end of the repairing tube 1 and a heated fluid is fed through the hose 25 to heat the repairing tube 1 while pulling the same into the pipe line 2. As a consequence, the repairing tube 1 is not cooled and hence not hardened while it is pulled into the pipe line 2, and hence is able to smoothly conform to the interior wall surface contours of the pipe line 2, even at bends therein.

Since the leading end of the repairing tube 1 is positioned at the tip of the hose 25 and the heated fluid is jetted from the hose 25 the leading end of the repairing tube 1 is particularly strongly heated to be kept in its softened state. It therefore is able to easily change its direction, even at bend portion and drop in joint of the pipe line 2, while conforming to the interior wall surface contours of the pipe line.

Furthermore, according to the present method for removing the repairing tube 1, the repairing tube 1 lining a pipe line 2 along its interior wall surface is collapsed by evacuation into a reduced cross section, which results in a substantial decrease in frictional resistance between the repairing tube 1 and the pipe line 2. As a consequence, even in those cases where repairing tubes 1 cannot be pulled out just by heating for softening, they can be easily pulled out by a small amount of force in accordance with the method of the present invention whereby the repairing tube 1 is deformed into a reduced cross section. Also in the case of pipe lines 2 having bends therein, the repairing tube 1 can be easily pulled out in the same manner as described above.

In the following examples and comparative examples, repairing tubes of the present invention and state-of-the-art tubes, respectively, were formed and effects of both types were compared by a pipe line-lining test.

EXAMPLE 1

A tubular woven fabric 4 was made by using, as the warp 5, 1,170 yarns each of which was made by twisting five 150 d. crimped polybutylene terephthalate filament yarns and, as the weft 6 for picking at a count of 10 yarns/inch, two paralleled yarns each of which was made by twisting twenty-one 150 d. crimped polybutylene terephthalate filament yarns.

The tubular woven fabric 4 was placed on the interior wall surface of a rigid pipe 3 formed of linear low density polyethylene resin to afford a repairing tube 1 in one body having an outer diameter of 151.6 mm and a wall thickness of 3.5mm.

EXAMPLE 2

A tubular woven fabric 4 was made by using, as the warp 5, 608 yarns each of which was made by twisting eight 150 d. crimped polybutylene terephthalate filament yarns and, as the weft 6 for picking at a count of 10 yarns/inch, a yarn made by twisting forty-five 150 d. crimped polybutylene terephthalate filament yarns.

The tubular woven fabric 4 was embedded in the wall of a rigid pipe 3 formed of linear low density polyethylene resin to afford a repairing tube 1 in one body having an outer diameter of 136.9 mm and a wall thickness of 4.0 mm.

EXAMPLE 3

A tubular woven fabric 4 of the same structure as in Example 1 was used. The tubular woven fabric 4 was embedded in the wall of a rigid pipe 3 formed of polyvinyl chloride resin to afford a repairing tube 1 in one body having an outer diameter of 151.8 mm and a wall thickness of 3.8 mm.

Comparative example 1

A tube having an outer diameter of 149.1 mm and a wall thickness of 3.9 mm was formed of linear low density polyethylene resin alone without using any tubular woven fabric 4.

Comparative example 2

A tubular woven fabric 4 was made by using, as the warp 5, 300 yarns each of which was made by twisting two 1,000 d. non-stretchable bulked polyester filament yarns and, as the weft 6 for picking at a count of 38 yarns/inch, a yarn made by twisting two 1,000 d. non-stretchable bulked polyester fiber yarns.

The tubular woven fabric 4 was embedded in the wall of a rigid pipe 3 formed of linear low density polyethylene to afford a tube in one body having an outer diameter of 148.8 mm and a wall thickness of 4.1 mm.

Comparative example 3

A tube having an outer diameter of 151.0 mm and a wall thickness of 4.2 mm was formed of polyvinyl chloride resin alone without using any tubular woven fabric 4.

Pipe line-lining test

Pipe lines each having a length of about 30 m, a nominal inner diameter of 150 mm and four 45° bends were used and lined with the tubes of the examples and comparative examples mentioned above.

Each tube was flattened, and the flattened tube was, while being transversely deformed into an approximately U-shaped cross section, pulled into the pipe line 2 at a rate of 4 m/min with a rope which had been inserted in the pipe line 2.

Metallic air-tight sealers were then attached to the ends of each tube to seal them and steam was fed into the tube to increase the internal pressure gradually up to 1.0 kg/cm$^2$, which pressure was maintained for 5 minutes. The temperature of the tube during this operation was about 90° C.

While maintaining the internal pressure, the steam was replaced with air to cool the tube and the lining operation was terminated when the tube temperature has been decreased to 50° C. or below.

Table 1 shows, for each of the tubes of the examples and comparative examples, the strength per unit width (in kgf/cm) of the tube heated to 90° C. and the extension under a tensile force of 1.3 DP (=1.3×15×1= about 20 kgf/cm). The measurement of these values was carried out in accordance with the tensile test protocol for plastics of JIS K7113.

TABLE 1

|  | Strength per unit width (kgf/cm) | Extension under 20 kgf/cm load (%) |
| --- | --- | --- |
| Example 1 | 54 | 23 |
| Example 2 | 61 | 11 |
| Example 3 | 42 | 28 |
| Comparative example 1 | 12 | impossible to measure |
| Comparative example 2 | 110 | 5 |
| Comparative example 3 | 2 | impossible to measure |

It was revealed from the experimental results that, in any one of Examples 1–3, the repairing tube 1 conformed properly to the interior wall surface contours of the pipe line 2 without forming any gaps due to unsatisfactory conformance between the pipe line 2 and the repairing tube 1 in the straight regions and in the inner bend regions of the pipe line 2, as a matter of course, and also in the outer bend regions of the pipe line 2. In Example 2, although the repairing tube 1 is considered to exert little pushing force on the pipe line 2 in its outer bend regions, it was found to give an adequate repairing effect on the pipe line 2.

In contrast, in Comparative example 2 the repairing tube 1 did not properly conform to the interior wall surface contours, thus forming large gaps, in the outer bend regions of the pipe line 2, because of its small extension upon application of tensile load.

The thicknesses of the outer and inner bend portions of the repairing tube located in the bends of the pipe line were compared to find that there was little difference between the results of Examples 1 and 2. The results of Example 3 showed that the outer bend portions were thinner than the inner bend portions by approximately 20%, which unevenness in thickness, however, was not such that would cause the lining to be adversely affected.

In contrast, in Comparative example 1 where no tubular woven fabric is provided, the outer bend portions of the repairing tube were found to undergo significant extension into a wall thickness one-third or less than one-third that of the inner bend portions, which wall thickness is not suitable for the lining of pipe lines.

In Comparative example 3 where no tubular woven fabric was provided and the strength of the rigid pipe was insufficient, the tube ruptured in the course of its being pressurized, it thus being impossible to conduct lining operations therewith.

As mentioned in the foregoing, even where there arises a significant difference in length between the wall portions of the present repairing tube 1 in the inner and outer bend regions of a pipe line 2, the outer wall portion is extended by internal pressure, so that it is able to conform to the outer bend portion of the pipe line 2, with no wrinkles formed in the inner bend portion of the repairing tube 1.

Furthermore, since the extensibility of the repairing tube 1 is restricted by the tubular woven fabric 4, the repairing tube 1 can by no means be excessively extended locally, so that any portion thereof cannot be extremely thinned or broken, even if there partially occurs some difference in degree of extension. Pull-test of tube A polyethylene tube (FIG. 2) having an outer diameter of about 150 mm and a thickness of 5 mm, in which a tubular woven fabric was embedded in, and thereby integrated with, the thermoplastic resin layer of a rigid pipe, was inserted into a pipe line of 150 mm in inner diameter and 30 m in length which had four 15° bends therein. The tube was expanded by heating and pressurization to line the interior wall surface of the pipe line, and then cooled down to ordinary temperature.

Subsequently, steam was blown into the tube to heat the same, and an attempt to pull the tube out of the pipe line was made by connecting one end of the tube to a winch and pulling the tube with the winch. It was impossible, however, to pull it out of the pipe line even with a force of as strong as 1 ton.

Both ends of the tube were sealed and the interior of the tube was evacuated from one end with a vacuum pump, whereby the tube collapsed in the pipe line into an approximately U-shaped cross section. With the winch mentioned above, the tube could be pulled out with a force of about 240 kg.

The same tube as mentioned above was used to line the interior wall surface of the same pipe line as mentioned above and steam was blown from one end into the tube to heat the same. At a point of time when the steam was jetted out of the other end of the tube, both ends were sealed, whereby the tube collapsed after 10 minutes in the pipe line into an approximately U-shaped cross section. Using the above-mentioned winch in the same manner as described above, the tube could be pulled out of the pipe line with a force of about 350 kg.

We claim:

1. A repairing tube used in a pipeline repairing process in which the tube is deformed under heating, pulled into a pipeline and expanded into a cylindrical configuration using a heated and pressurized fluid so that the tube conforms to the internal wall surface contours of the pipeline, characterized in that the tube comprises a rigid pipe including a thermoplastic resin having a Vicat softening point higher than the temperature of the heating and a tubular woven fabric, the tubular woven fabric being integrated with the rigid pipe either by being brought into intimate contact with an interior wall surface or an exterior wall surface of the rigid pipe or by being embedded in the thermoplastic resin of the rigid pipe, the strength of the tube per unit width in the longitudinal direction in kgf/cm, when heated, being not less than 1.3 times DP, DP being defined as the product of the diameter D of the pipeline and the pressure P of the fluid.

2. The repairing tube as claimed in claim 1, wherein the tubular woven fabric is composed of warp and weft, said warp being crimped yarns of synthetic fibers, said yarns being highly extensible under low load and, which once extended to a certain length, supporting high load without farther extension.

3. The repairing tube as claimed in claim 1, wherein the tubular woven fabric is composed of warp and weft, said warp being covered yarns, each of said covered yarns including an elastic yarn having a synthetic fiber yarn spirally turned thereon, said covered yarns being highly extensible under low load and once extended to a certain length, supporting high load without farther extension.

4. The repairing tube as claimed in claim 1, wherein the thermoplastic resin includes an inner resin layer formed of a first thermoplastic resin having a softening point higher than the temperature of a heated and pressurized fluid to be fed into the tube and an outer resin layer formed of a second thermoplastic resin having a softening point lower than that of the first thermoplastic resin, and the tubular woven fabric is integrated with the rigid pipe by being overlaid onto the inner resin layer constituting the interior wall surface of the rigid pipe.

5. The repairing tube as claimed in claim 4, wherein the first thermoplastic resin is high density polyethylene and the second thermoplastic resin is linear low density polyethylene.

6. A method for repairing a pipe line with a repairing tube comprising a rigid pipe formed by extrusion molding of thermoplastic resin into a cylindrical shape and a tubular woven fabric, the method comprising the steps of:

flattening the repairing tube into a collapsed state of reduced cross section at a first temperature in the vicinity of the Vicat softening point of the thermoplastic resin;

heating the collapsed repairing tube to a second temperature which is well below the Vicat softening point of the thermoplastic resin and at which the tube is deformable;

bending the repairing tube heated at the second temperature, while keeping it in its collapsed state, into an approximately V- or U-shaped cross section;

inserting the bent tube into the pipe line; and expanding the repairing tube by applying internal pressure thereto using a first heated fluid, while heating the repairing tube to a third temperature higher than the second temperature for the bending, so that the tube conforms to interior wall surface contours of the pipe line, wherein the strength of the tube per unit width in the longitudinal direction in kgf/cm, when heated to the third temperature, being not less than 1.3 times DP, being defined as the product of the diameter D of the pipeline and the pressure P of the first fluid.

7. The method as claimed in claim 6, further comprising the step of, prior to the bending step and the inserting step, air-tightly sealing each end of the repairing tube.

8. The method as claimed in claim 6, further comprising the step of, prior to the bending step and the inserting step, evacuating the interior of the repairing tube to a reduced pressure.

9. The method as claimed in claim 6, further comprising the step of, prior to the inserting step, feeding a second heated fluid into the pipeline.

10. A method for removing a repairing tube, which has been heated and expanded by a fluid in order to line a pipe line, out of the pipe line lined therewith, the strength of the tube per unit width in the longitudinal direction in kgf/cm, when heated, being not less than 1.3 times DP, DP being defined as the product of the diameter D of the pipeline and the pressure P of the fluid, which comprises the steps of evacuating the interior of the repairing tube to deform the repairing tube into a reduced cross section and pulling the repairing tube out of the pipe line.

11. The method as claimed in claim 10, further comprising the step of, prior to or during the evacuating step, heating the repairing tube into a softened state.

12. The method as claimed in claim 10, wherein the evacuating step includes filling the repairing tube with pressurized steam, air-tightly sealing both ends of the thus heated repairing tube so that the pressurized steam filling the repairing tube condenses and so that the internal pressure of the repairing tube is reduced.

13. The method as claimed in claim 10, further comprising the step of, prior to the evacuating step, sealing air-tightly one end of the repairing tube.

14. The repairing tube as claimed in claim 2, wherein the warp of the tubular woven fabric is made of polybutylene terephthalate filament yarns.

15. The repairing tube as claimed in claim 3, wherein the elastic yarn is made of polyurethane.

16. The repairing tube as claimed in claim 1, wherein the tube has a longitudinal extension in the range of 10 to 30% when a load corresponding to 1.3 times DP is applied thereto.

17. The repairing tube as claimed in claim 16, wherein the tubular woven fabric is composed of warp and weft, said warp being crimped yarns of synthetic fibers, said yarns being highly extensible under low load and, which once extended to a certain length, supporting high load without further extension.

18. The repairing tube as claimed in claim 16, wherein the tubular woven fabric is composed of warp and weft, said warp being covered yarns, each of said covered yarns including an elastic yarn having a synthetic fiber yarn spirally turned thereon, said covered yarns being highly extensible under low load and once extended to a certain length, supporting high load without further extension.

19. The repairing tube as claimed in claim 16, wherein the thermoplastic resin includes an inner resin layer formed of a first thermoplastic resin having a softening point higher than the temperature of a heated and pressurized fluid to be fed into the tube and an outer resin layer formed of a second thermoplastic resin having a softening point lower than that of the first thermoplastic resin, and the tubular woven fabric is integrated with the rigid pipe by being overlaid onto the inner resin layer constituting the interior wall surface of the rigid pipe.

20. The repairing tube as claimed in claim 19, wherein the first thermoplastic resin is high density polyethylene and the second thermoplastic resin is linear low density polyethylene.

21. The method as claimed in claim 6, wherein the tube has a longitudinal extension in the range of 10 to 30% when a load corresponding to 1.3 times DP is applied thereto.

22. The method as claimed in claim 21, further comprising the step of, prior to the bending step and the inserting step, air-tightly sealing each end of the repairing tube.

23. The method as claimed in claim 21, further comprising the step of, prior to the bending step and the inserting step, evacuating the interior of the repairing tube to a reduced pressure.

24. The method as claimed in claim 21, further comprising the step of, prior to the inserting step, feeding a second heated fluid into the pipe line.

25. A method for removing a repairing tube, which has been heated and expanded by a fluid in order to line a pipe line, out of the pipe line lined therewith, the strength of the tube per unit width in the longitudinal direction in kgf/cm, when heated, being not less than 1.3 times DP, DP being defined as the product of the diameter D of the pipeline and the pressure P of the fluid, which comprises the steps of heating the repairing tube into a softened state, evacuating the interior of the repairing tube to deform the repairing tube into a reduced cross section and pulling the repairing tube out of the pipe line.

26. The method as claimed in claim 25, wherein the tube has a longitudinal extension in the range of 10 to 30% when a load corresponding to 1.3 times DP is applied thereto.

27. The method as claimed in claim 25, wherein the evacuating step includes filling the repairing tube with pressurized steam, air-tightly sealing both ends of the thus heated repairing tube so that the pressurized steam filling the repairing tube condenses and so that the internal pressure of the repairing tube is reduced.

28. The method as claimed in claim 26, wherein the evacuating step includes filling the repairing tube with pressurized steam, air-tightly sealing both ends of the thus heated repairing tube so that the pressurized steam filling the repairing tube condenses and so that the internal pressure of the repairing tube is reduced.

29. The method as claimed in claim 25, further comprising the step of, prior to the evacuating step, sealing air-tightly one end of the repairing tube.

30. The method as claimed in claim 26, further comprising the step of, prior to the evacuating step, sealing air-tightly one end of the repairing tube.

31. The repairing tube as claimed in claim 17, wherein the warp of the tubular woven fabric is made of polybutylene terephthalate filament yarns.

32. The repairing tube as claimed in claim 18, wherein the elastic yarn is made of polyurethane.

* * * * *